United States Patent [19]

Provost et al.

[11] Patent Number: 5,105,372

[45] Date of Patent: Apr. 14, 1992

[54] DATA PROCESSING SYSTEM USING A KALMAN FILTERING

[75] Inventors: Michael J. Provost, Nottingham; David A. Nevell, Derby, both of England

[73] Assignee: Rolls-Royce plc, London, England

[21] Appl. No.: 649,296

[22] Filed: Jan. 30, 1991

Related U.S. Application Data

[63] Continuation of Ser. No. 481,721, Feb. 16, 1990, abandoned, which is a continuation of Ser. No. 247,857, Sep. 22, 1988, abandoned.

[30] Foreign Application Priority Data

Oct. 31, 1987 [GB] United Kingdom ............... 8725585

[51] Int. Cl.$^5$ ........................................ G01M 15/00
[52] U.S. Cl. ........................ 364/551.01; 364/572; 364/431.02; 324/378; 73/116
[58] Field of Search ............ 364/530, 551.01, 551.02, 364/572, 579, 580; 340/679; 324/378, 379; 73/116, 119 R

[56] References Cited

U.S. PATENT DOCUMENTS

| | | | |
|---|---|---|---|
| 4,462,081 | 7/1984 | Lehan | 364/572 |
| 4,472,812 | 9/1984 | Sakaki et al. | 375/14 |
| 4,511,219 | 4/1985 | Giles et al. | 350/388 |
| 4,575,803 | 3/1986 | Moore | 364/550 |
| 4,625,280 | 11/1986 | Couch | 364/551.01 |
| 4,815,014 | 3/1989 | Lipner et al. | 364/550 |

FOREIGN PATENT DOCUMENTS 0095378 11/1983 European Pat. Off.
2029970 3/1980 United Kingdom.
2164765 3/1986 United Kingdom.

OTHER PUBLICATIONS

Engineering Notes, vol. 16, No. 3, pp. 222-224, A Decision Theory Model for Health Monitoring of Aeroengines, V. Sarma et al., Jun. 1978.
Journal of Econometrics 19 (1982) 7-22, May 1982, A Bayesian Approach to Retrospective Identification of Change-Points, N. B. Booth et al.

Primary Examiner—Joseph L. Dixon
Attorney, Agent, or Firm—Cushman, Darby & Cushman

[57] ABSTRACT

For processing data relating to the performance of an apparatus, the data is analyzed using a Kalman Filter. After a first pass of data through the filter, the results are refined by discarding at least one less significant component performance change and/or sensor bias. The Kalman Filter is then re-run using the modified data. As further runs of the Kalman Filter are performed, as required, the input of each successive run is refined by discarding from the preceding run at least one further component performance change and/or sensor bias. For each run, an objective function is evaluated for the amount of unexplained measurement change and/or the amount of component performance change and sensor bias. The run whose results show an acceptable value for the objective function is selected as the best solution. In this way, the tendency of the Kalman Filter to distribute the cause of any sensed performance change over all the possible sources of that change is avoided. The sets of measurement data are then analyzed to determine levels and/or trends in component performance and sensor bias.

18 Claims, 3 Drawing Sheets

DATA PROCESSING SYSTEM USING A KALMAN FILTERING

This is a continuation of application Ser. No. 07/481,721, filed on Feb. 16, 1990, which was abandoned upon the filing hereof which is a continuation of Ser. No. 07/247,857, filed Sept. 22, 1988 now abandoned.

BACKGROUND OF THE INVENTION

The invention relates to a method and system for processing data relating to the preformance of apparatus having a number of distinct components in order to estimate both changes both changes in the performance of the individual components making up the apparatus and biases or systematic errors in a measurment system being used being used to determine the performance of the apparatus and its components. Although it has particular relevance to analyzing the performance of gas turbines, the present invention has more general applications to a wide variety of apparatus including machines, particularly prime movers and other rotary machines, plants and such as chemical process plants, generating and distribution plants, etc.

Monitoring the performance of such machines and plants plant can yield important data on maintenance requirements to achieve safe, economical and reliable operation. It is particularly important in such circumstances to determine both which components of the machine or plant being monitored have deviated from their required performance specifications and which measurements being used for monitoring have developed systematic errors, in order to refurbish or replace only those components which have deteriorated and refurbish, replace or recalibrate faulty measuring equipment that, because of the presence of systematic errors, is producing spurious indications.

It is important to note that the overall performance of any apparatus made up of a number of components is completely determined by the performance of such components. For example, in a gas turbine, overall performance measurements such as fuel consumption, speed, exhaust temperature, etc. are determined by component performance parameters such as efficiency, flow capacity, etc. Generally, changes in one or more component performance parameters will cause changes in one of more overall performance measurements, and it is only possible to alter overall performance measurements by altering one or more component performance parameters. Thus, it is only possible to improve the fuel consumption of a gas turbine by altering the efficiency end/or flow capacity of one or more of its components. Naturally, some apparent changes in overall performance may be caused, not by component performance changes, but by biases in the measurements used to determine the overall performance. The problem exists, therefore, to be able to assess, from an analysis of changes in performance measurements, both the component preformance parameters that have changed and biases in the measurements.

To assist the engineer in this task, recent years have seen the introduction of computer-based performance data analysis systems, particularly in the field of gas turbines. From the preceding comments it can be appreciated that any analysis has to be performed using a number of known data items (i.e. performance measurements) which are generally less than the number of unknown data items (i.e. component performance parameter changes and sensor biases). There is therefore no single true solution set of component performance parameter changes and sensor biases to be derived from a particular set of performance measurement data, and techniques are required that derive the most likely solution. In particular, so-called Optimal Estimation or Kalman Filtering computation techniques have been used to analyse gas turbine performance data (see, for example, "Gas Path Analysis applied to Turbine Engine Condition Monitoring", L. A. Urban, AIAA 72-1082 (1973) and "Gas Path Analysis: An Approach to Engine Diagnostics", Dr A. J. Volponi, 35th Mechanical Failure Prevention Group (1982)). The basic theory behind Kalman Filtering is also well known (see, for example, "Digital and Kalman Filtering", S. M. Bozic, Pub E Arnold (1984); "Applied Optimal Estimation", A Gelb (ed), Pub MIT Press (1974); "Applied Optimal Control", A. E. Bryson and Y. C. Ho, Pub Halstead Press (1975); "System Identification", P. Eykhoff, Pub Wiley (1974)).

The Kalman Filter is an algorithm for producing, from given data, the most likely solution, based on the method of least squares. Stated in its simplest form it may be seen as a weighting matrix (sometimes termed the Kalman Gain Matrix) which inter-relates a priori information (specifically a covariance matrix of component changes and sensor biases, a measurement repeatability covariance matrix and a System Matrix, i.e. a matrix giving the relationships between observed measurement changes and component changes and sensor biases) to enable the most likely set of component changes and sensor biases to be from the observed performance measurement changes.

The Kalman Filter algorithm is thus given a set of observed performance measurement changes. Each of these changes represents the change in value of a parameter from a datum level (at which there are no component changes or sensor biases to be taken into account) to an operational level (which has been affected by such changes and biases). The algorithm calculates which set of component performance changes and sensor biases is most likely to have caused the given set of observed performance measurement changes, using information described in the preceding paragraph.

An inherent shortcoming of the Kalman Filter is that, because it operates on the basis of least squares, it tends to allocate a value to all possible component changes and sensor biases, even if the observed performance measurement changes input to the filter are due to only a small sub-set of the possible component changes and sensor biases. Thus, the effects of any genuine component performance changes and/or sensor biases tend to be "smeared" over all possible component changes and sensor biases, leading the an under-estimation of actual component changes and/or sensor biases which may have occurred in any particular situation.

In the extensive literature describing the use of the Kalman Filter for the analysis of apparatus (particularly gas turbines), this problem is either ignored or addressed in one of four different ways. First the problem may be alleviated, but not eliminated, by adjusting the a priori matrices used to calculate the Kalman Gain Matrix. Second, additional algorithms which assume the presence of a single component change or sensor bias are run after after the Kalman Filter. These algorithms are activated if the results from the Kalman Filter exceed certain thresholds. Third, searches are made for sensor biases using separate algorithms run before and/or after the Kalman Filters, Fourth, "banks" of Kalman Filters are set up to analyze a given piece of apparatus. Each filter in such a bank is set up to analyze a different combination of component changes and sensor biases, while other algorithms are used to decide which filter is correct in any given sitution.

These approaches are unsatisfactory because they either work within the restrictions of the Kalman Filter without solving the basic "smearing" tendency, or rely on gross assumptions about the number, combinations, and magnitudes of component changes and/or sensor biases, which may not always be correct.

SUMMARY OF THE INVENTION

According to one aspect of the present invention, there is provided a method of processing data relating to the performance of an apparatus consisting of a series of individual components in order to determine changes in component preformance and/or sensor bias from a series of performance measurements from the aparatus. A Kalman Filter is used to analyze changes in the performance measurements, wherein the Kalman Filter is applied to the measurements in a series of runs, each suceeding run after the first having the causes of the changes in the performance measurements allocated to a smaller number of component performance changes and/or sensor biases than the preceding run. The component performance changes and/or sensor biases to be eliminated from the next succeeding run are selected by evaluating a measure of significance for the changes and biases indicated in the preceding run. One or more of the least significant changes and/or biases are discarded as a best answer for the component performance changes and/or sensor biases, causing the difference in performance measurements is selected when the result of that run in which there is a minimum number of said changes and/or biases that account for the observed performance measurement changes.

More specifically, a method is provided according to the invention for procesing data relating to the performance of an apparatus consisting of a series of individual components, to determine the changes in component performance and the magnitude of biases in the measurement system from a series of performance measurements from the apparatus comprising the steps of:

a) defining the a priori information required by the Kalman Filter, including:
   i) a covariance matrix of component performance changes and sensor biases,
   ii) a measurement repeatability covariance matrix,
   iii) a System Matrix giving the relationships between observed measurement changes and sensor biases and,
   iv) if required, a priori best estimate of component changes and sensor biases;
b) obtaining performance measurements from the apparatus;
c) obtaining datum levels of the performance measurements from the apparatus;
d) using the data of steps (b) and (c) to calculate observed performance measurement changes from datum levels;
e) using the data of steps (a) and (d) to derive a most likely set of component changes and sensor biases by employing a Kalman Filter;
f) evaluating an objective function giving a measure of the amount of unexplained measurement change and/or the amount of component change and sensor bias in the solution from (e);
g) discarding one or more of the least significant component changes and/or sensor biases to leave one or more of said component changes and/or sensor biases for evaluation;
h) using the undiscarded component changes and/or sensor biases from the preceding step, repeating steps (e) to (g), if required, until the total number of component changes and sensor biases left is one; and
i) considering the sets of estimated component changes and/or sensor biases produced in each pass of step (e), together with the corresponding objective function evaluated according to step (f), to determine which of the passes has produced a minimum number of component changes and sensor biases that satisfactorily accounts for the observed performance measurement changes.

In the performance of this method, the reiteration of steps (e) to (g) produces a sequence of vectors of components changes and sensor biases which account for the observed performance measurement differences, each successive vector containing progressively less numbers of component changes and sensor biases. The selection of an appropriate answer is made by using the objective function, worked out for each vector in step (f) above. One mentod of working out such an objective function is to derive the sum of squares of the unexplained measurement changes, weighted according to the measurement repeatability covariance matrix. This gives a value which has a chi-square distribution, with as many degrees of freedom as there are performance measurements to be analyzed.

In the final result from step (i), above, the selected best answer is preferably refined by discarding thsse elements whose values (expressed e. g. either in absolute terms or as a number of standard deviations) are less than a predetermined lower level, in order to eliminate minor component changes and sensor biases that can be safely ignored or that may be present in the answer as residual "smearing" effect.

As a preferred basis for the rejection process in step (g), the estimated component changes and sensor biases can be normalized by dividing the individual estimated component changes and sensor biases by the square roots of the corresponding diagonal elements of the a posteriori covariance matrix produced as output from the Kalman Filter.

To select the elements to be discarded in step (h), a preferred method on the first pass is to evaluate the average amount of absolute normalized change (i.e. with sign removed) and then discard all elements whose absolute normalized change is below that average. For subsequent passes, all component changes and/or sensor biases whose absolute values of normalized change are less than the previous pass are discarded. However, in each pass, provision must be made to reject at least one component change or bias (usually the one having the smallest absolute value of normalized change) and to retain at least one component change of sensor bias (usually the one having the largest absolute value of normalized change).

When establishing the System Matrix, the effects of changes in the components of the apparatus under investigation on the measurements used to determine the performance of the apparatus and its components must be determined. Care should be exercised to ensure that suitable measurements are taken which respond in distinct ways to the component changes being sought.

GAS TURBINE ANALYSIS

In the example of a gas turbine analysis, the component changes may involve changes in seal clearances, the presence of foreign matter in particular locations, the opening of gas leakage paths, etc. These can each be related to one or more component performance parameter changes. A list of these related changes is shown in Talbe A.

TABLE A

Relation of Changes

| Component Changes | Performance Parameter Changes |
|---|---|
| turbine tip seal rubs nozzle guide vane platform seal gaps; blocked nozzle guide vane cooling holes | turbine efficiency changes turbine capacity changes; cooling air changes |
| compressor blade tip erosion; dirt on compressor blades; damage by foreign object | compressor efficiency changes |
| mis-shapen final nozzle | nozzle discharge and velocity coefficient changes |
| seal gap increases | cooling air changes |
| air offtake pipe leaks | environmental control system bleed changes |

The causes of a change in engine performance can accordingly be expressed as a series of component performance parameter changes, such as
fan tip efficiency and capacity changes,
fan root/booster efficiency and capacity changes,
core compressor efficiency and capacity changes,
turbine efficiency and capacity changes,
combustion chamber pressure loss changes,
by-pass duct pressure loss changes,
nozzle discharge and velocity coefficient changes,
cooling/sealing air flow changes, and
environmental control system bleed and power offtake changes.

These changes will each affect overall engine performance parameters such as cruise specific fuel consumption, take-off turbine exhaust temperature, compressor working line levels, etc. The purpose of the performance measurements made is to enable resolution of the causes of such overall performance parameter changes, by identification of the individual component performance parameter changes that caused them.

Few if any of the component performance parameter changes can be directly measured in practice. Moreover, the measurement instrumentation available in a production engine will be extremelly limited as compared with a fully instrumented engine in a test rig. The typical performance measurements that may be available are measurements such as
shaft speeds,
fuel flow,
(test-bed) thrust,
total inlet air flow (itself derived from total and static pressure
measurements and total temperature),
total and/or static pressures in the engine gas path through either or multiple taps in that path,
total and/or "static" temperatures in the engine gas path (the former through single or multiple taps and the latter through wall-mounted transducers); and
a power level parameter (e.g. exhaust pressure ratio or output shaft torque).

After establishing the list of possible component performance parameter changes and the list of available performance measurements, a component exhange rate table is generated showing the percentage change in each performance measurement for a small change of each component performance parameter (e.g., a 1% change, or a unit change if the datum value is zero) at the operational conditions, i.e. the flight conditions and power level, at which the analysis is to be performed.

FURTHER GENERAL FACTORS IN THE ANALYSIS PROCESS

Also to be considered in the analysis of the performance of an apparatus, such as a gas turbine, are environmental parameters, since environmental changes can alter the engine performance. Measurements are therefore required defining the environmental conditions. Depending upon whether the analysis is being performed in flight or on a test-bed, these environmental measurements include altitude, Mach No, total air temperature (flight), cell pressure and air intake temperature (test-bed), and preferably appropriate measurements for humidity determination. With these, there must always be one performance measurement from the preceding table before any form of analysis can be begin. This performance measurement is used to define the power level.

It will normally also be required to include the effects of environmental and power level measurment sensor bias in the analysis, for which it is necessary to calculate the effects of small (e.g., 1%) biases, in flight conditions and power-setting parameter measurements, these having been assumed fixed when establishing the component exchange rate table. This is done calculating the percentage changes in the performance measurements in the flight condition and power level measurements are changed by a negative increment, to create the environmental exchange rate table. The negative sign is chosen because a positive bias, i.e., a higher reding than the actual value, will produce apparently depressed performance measurements.

The effects of a performance measurment sensor bias on the analysis can be included by generating a further matrix. This can be formulated essentially as a matrix which states that a sensor bias (e.g., 1%) in a performance measurement produces a corresponding change in that measurement while leaving all the other measurements unaffected. If sensor bias is considered possible in all the measurements, this matrix is an identity matrix.

A combined matrix, which is here termed the System Matrix, can then be created by concatenating the component exchange rate table, the environmental exchange rate table and the performance measurement sensor bias matrix.

A further factor which it is usually necessary to consider is the random error that exists in all measurement systems. That is to say, the degree of accuracy of any measurement is not represented solely by sensor biases rather, there will also be uncertainty due to random variations caused by many small effects which lead to differences in repeated measurements of a given quantity. This error source is referred to here as repeatability. Random variations will also occur in the environmental and power level measurements, introducing further repeatability factors. It can be assumed, if bias is accounted for separately, that these random variations will have the well-known normal distribution. To take account of repeatability, it is therefore necessary to determine standard deviations for the repeatabilities of the environmental and power level measurements. The analysis must give due weight to the repeatability of all the measurements.

The measurement repeatability standard deviations can be determined either by dedicated testing of the measurement system, in which the statistical properties of the measurement system are calculated from the output generated by known input signals, or from previous experience of either the system being used or of similar systems in use elsewhere.

The standard deviations of component change and sensor bias can be determined by a variety of methods including, for example, analyzing data taken from a large "family" of nominally identical pieces of apparatus of the type being analyzed, or making an informed assessment using experience and judgement, perhaps refined by studying the response of the Kalman Filter to performance measurement changes corresponding to known component changes and sensor biases.

DETAILED DESCRIPTION OF AN ANALYTICAL PROCESS

Figure 1:
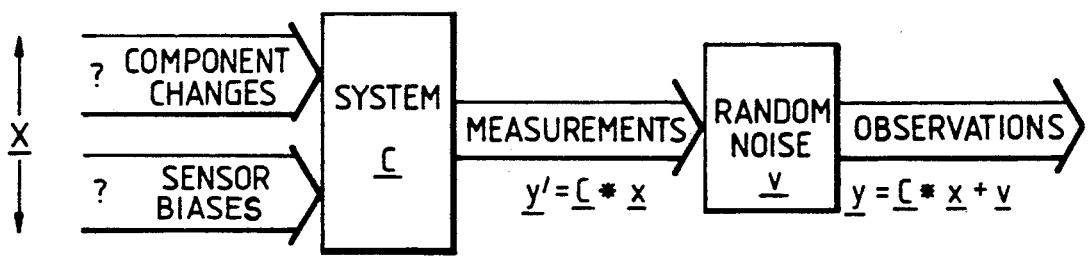

To establish the Kalman Filter, the following inputs are required. First, component exchange rate and environmental exchange rate tables, as discussed above, are needed to produce the System Matrix. These tables contain the established relationships between component changes and performance measurements and the changes in performance measurements due to environmental and power level measurement errors. Second, a set of expected levels of performance measurements at the flight conditions and power level at which the analysis is to be performed for a datum engine (i.e. an engine with performance at some desired level with which other engines can be compared) is required. Since the best estimates of component changes and sensor biasses produced by the Kalman Filter will be relative to this datum, it follows that the datum engine component changes and sensor biases ae all zero. In the performance analysis, percentage differences between observed and expected levels of performance measurements will be input into the Kalman Filter to produce the desired best estimates of component changes and sensor biases that have produced those differences. Third, a set of standard deviations of the repeatability in the performance measurements, flight condition measurements and power level measurements is needed to calculate the a priori measurement nonrepeatability covariance matrix. Finally, a set of standard deviations in the component changes and sensor biases about their normal (usually zero) levels is needed to create the a priori component change and sensor bias covariance matrix which is, usually (but not necessarily limited to) a diagonal matrix containing the squares of these standard deviations.

The basic equation defining the analysis being undertaken and which forms a starting point for the Kalman Filter is $$y = C*x + v$$

in which:

y = (m*1) column vector of differences between observed and expected levels of performance measurements;

C = (m*n) System Matrix, as described above, defining the effect on the performance measurements of given changes in component performance parameters, environmental and power level measurement sensor biases and performance measurement sensor biases;

x = (n*1) column vector of changes in component performance parameters and sensor biases; and v = (m*1) column vector of noise terms in the performance measurements differences (assumed to be normally distributed), with a mean zero and a known covariance R.

It can be seen that the equation states the relationship between the performance measurement differences from expectation and the component changes and sensor biases that generated them. The noise terms represent a degree of corruption of the performance measurement differences due to random errors in the measurement system.

As has already been explained, since the number of terms (n) in x is usually considerably greater than the number of terms (m) in y, there is no unique solution that identifies which term or terms in x has generated a change in y. All that is possible by mathematical analysis is a "best estimate", i.e. a solution expressed as the most likely vector of component changes and sensor biases that has generated an observed vector of performance measurement differences. Through the algorithm known as the Kalman Filter that estimate can be generated.

The Kalman Filter can be expressed in the following group of equations:

$$x = x_o + K*(y - C*x_o)$$

$$K = Q*C^{T}*(C*Q*C^{T}R)^{-1}$$

$$P_1 = (I - K*C)*Q$$

where x = (n*1) column vector of best estimates of component changes and sensor biasses after performance measurement differences from expectation are observed;

$x_o$ = (n*1) column vector of best estimates of component changes and sensor biasses before performance measurement differences from expectation are observed (this vector is usually zero which reduces the equation to x = K*y);

y = (m*1) column vector of performance measurement differences from expectation;

K = (n*m) Kalman Gain Matrix;

C = (m*n) System Matrix, relating performance measurement differences to component changes and sensor biases;

Q = (n*n) a priori covariance matrix of component changes and sensor biases;

$P_1$ = (n*n) a posteriori covariance matrix of best estimates of component changes and sensor biases Superscript T denotes matrix transpose;

Superscript −1 denotes matrix inversion;

I denotes unit matrix of appropriate dimensions; and

R = (m*m) a priori measurement repeatability covariance matrix, which can be established in the form $$R = C*V*C^T$$

in which

V = (t*t) diagonal matrix of squares of standard deviations of repeatabilities, where t = number of environmental measurements plus number of performance measurements; and C'=(m*t) matrix which contains both the environmental exchange rate table and a unit matrix concatenated together.

The R matrix therefore contains the variances and covariances of the apparent repeatability in the performance measurement differences, arising from both repeatability in the observed performance measurements and the repeatability in the expected performance measurements that is a consequence of repeatability in the flight condition and power-level measurements that define the levels of expected performance measurements.

For a detailed derivation of the Kalman Filter equations, reference can be made to "Applied Optimal Estimation", A Gelb, M.I.T. Press 1974. The equations denote that K is proportional to the uncertainty in the estimation x and is inversely proportional to the uncertainty in the measurements y; K therefore weights the changes made to $x_o$ to produce x depending upon the relative certainty of y and x.

The use of prior information about expected levels of component changes and sensor biases, uncertainties in both the expected levels of component changes and sensor biases and uncertainties in the measurements relies upon the judgement of the skilled observer. That is to say, if there is no uncertainty about the mathematical relation between variables, but considerations of repeatability indicate a large uncertainty in the measurements, the best estimate of the relationship will not be affected by measurements that do not conform to the established mathematical relationship. On the other hand, if the relationship is uncertain and measurement repeatability is considered to be given negligible uncertainty, the best estimate of the relationship will be determined to a large extent by the measurements.

Generally, there is insufficient data available in the first instance for an adequate statistical analysis of these factors. From practical considerations, therefore, the values in the Q matrix are at least initially selected by the judgement of the user. To obtain a measure of how appropriate are the values chosen, in an initial processing of the input data it is possible to produce (by forming the product K*C) the set of vectors of best estimates of component performance changes and sensor biases for performance measurement differences appropriate to a unit change of each component change or sensor bias in turn and to examine the results to see whether, for a specific change in the performance of a component or the bias of a sensor, there is an unwanted confusion of the sought-for change or bias with the other changes and biases included. Should this be observed, the Q matrix can be modified to reduce the possible confusion to a minimum.

In an ideal case, the product (K*C) would be a unit matrix; confusion between the different parameters gives the diagonals of the matrix values less than unity, as well as non-zero off-diagonal elements. A preferred method of refining the Q matrix relies on first normalizing the (K*C) matrix by dividing each row by the corresponding diagonal element of the $P_1$ matrix. In the normalized matrix, the values in each column are then divided by the diagonal element of that column so as to produce a matrix in which all the diagonal elements are unity. This last step is performed primarily to aid recognition of the relative sizes of these diagonal elements to the other values of their column vector.

In making the comparison, the user will want to ensure that no ratio should be greater than unity, and that the number of ratios greater than 0.6, other than the diagonal element itself, should be minimized. The aim is that, for any column, the number of ratios greater than the average of the absolute values of all the ratios should be minimized. One way of doing this is to use an algorithm such as the Downhill Simplex Method (Nelder and Mead page 308, Computer Journal, Vol 7, 1965) to adjust the component change and sensor bias standard deviations. (i.e. the square root of the diagonal elements of the Q matrix) until the sum of the absolute values of the off-diagonal terms in the normalized K*C) matrix is minimized, giving extra weightings if necessary to elements with absolute values greater than 0.6 and elements with absolute values greater than 1.0.

If the analysis is carried out with no further refinement, however, the underlying mathematical principles, as already mentioned, result in all the component changes and sensor biases being analyzed as non-zero and give a result in which the observed performance measurement changes are attributed to all the possible component changes and sensor biases that might have caused them. This introduces a "smearing" effect which can result in the actual component changes and sensor biases being underestimated. In accordance with the present invention, the result is treated so as to concentrate the estimates around the more significant component changes and sensor biases that appear through the basic Kalman Filter analysis. This involves selectively removing individual changes and biases while redistributing any observed effects over the remaining changes and biases until the analysis yields a result which appears more appropriate to the observer, for example showing that the observed performance changes can be attributed wholly or mainly to a small number of significant component changes and/or sensor biases.

A preferred method of carrying out this process for concentrating the attribution of the changes involves the following steps:

(a) evaluate an objective function f;

$$f=(y-C^*x)^T*R^{-1}*(y-C^*x)$$

(this gives a measure of the amount of unexplained measurement change and has a chi-square distribution, with the number of degrees of freedom equal to the number or performance measurements);

(b) normalize each element of the vector x by dividing by the square root of the respective diagonal element of the $P_1$ matrix to produce vector $x_n$ with elements given by:

$$\text{i'th element of } x_n = \frac{\text{i'th element of } x}{\sqrt{\text{(i'th diagonal element of } P_1)}};$$

(c) component changes and sensor biases whose elements in $x_n$ have absolute values less than the average of all the absolute values of the elements $x_n$ are removed (at least one, but not all, of the component changes and sesor biases are removed in this step);

(d) the Kalman Filter is re-run, including only those component changes and sensor biases that have not been removed in step (c), to produce a new vector x of best estimates of component changes and sensor biases;

(e) steps (a),(b) and (d) are repeated such that those component changes and sensor biases whose elements in $x_n$ which have absolute values that are lower than in the preceding run are removed;

(f) steps (a), (b) and (d) are repeated until only one component change or sensor bias is left and the series of vectors of best estimates of component changes and sensor biases (each with a different number of changes and biases) produced by each run of the Kalman Filter are numbered sequentially in the order in which they were generated;

(g) a maximum is selected for the objective function value, either empirically or by calculation from a chi-square probability distribution, the number of degrees of freedon (which is equal to the number of performance measurements) and a user-defined probability level, and the highest-numbered x vector from step (f) whose corresponding objective function value is less than this maximum is selected as the "best answer", i.e. the selected result contains the smallest set of component changes and/or sensor biases that successfully accounts for the observed performance measurement differences (if none of the objective function values are less than the maximum, the basic Kalman Filter result from the first run is taken as the "best answer"); and (h) the "best answer" is further modified by rejecting component changes and sensor biases whose elements in x have absolute values less than either a user-specified absolute value or a user-specified absolute number of standard deviations, and the user is therefore presented with the most significant set of estimated component changes and sensor biases that generated the observed performance measurement differences.

FURTHER DEVELOPMENTS OF THE METHOD

The method described so far is one in which an analysis yields information based on a set of performance measurement differences obtained at a particular point in time. In certain situations, where the apparatus is being monitored over a period of time, it is possible to obtain a number of sets of performance measurement differences gathered sequentially over time. Each distinct type of performance measurement difference, gathered over time, can be considered as a time series in its own right, and can be processed using a number of well known prior art techniques, for example:

(a) moving average b) exponential smoothing c) Bayesian Inferencing.

Bayesian Inferencing is the preferred method of processing time series data, since an observed time series can be processed to produce:

a) level estimates, i.e. estimates of the value of a parameter in which, as far as possible, spurious disturbances from point to point have been removed, b) trend estimates, i.e. estimates of the rate of change of the parameter in question, and c) differences between the observed value of the parameter in question and the value that would be predicted from the level and trend estimates associated with the previous point in the time series.

Full details of this method are given in "Bayesian Forecasting", P. J. Harrison and C. F. Stevens, J. Royal Statistical Soc., 1976 and "A Bayesian Approach to Short-Term Forecasting", P. J. Harrison and C. F. Stevens, Operational Research Quarterly, Vol 2 No 4 1971. The equataions used are as follows:

$$s_1 = (p_{11,k-1}/r) + 2*(p_{12,k-1}/r + q_{12}/r) + (p_{22,-1/r} + q_{22}/r)$$

$$s_2 + (p_{12,k-1}/r + q_{12}/r) + p_{22,k-1}/r + q_{22}/r)$$

$$s_3 = (p_{22,k-1}/r + q_{22}/r)$$

$$\text{Delta}_k = \text{Obs}_k - (\text{Level}_{k-1} + \text{Trend}_{k-1})$$

$$\text{Level}_k = (\text{Level}_{k-1} + \text{Trend}_{k-1}) + (s_1/(s_1+1))*\text{Delta}_k$$

$$\text{Trend}_k = \text{Trend}_{k-1} + (s_2/(s_1+1))*\text{Delta}_k$$

$$P_{11,k}/r = s_1/(s_1+1)$$

$$P_{12,k}/r = s_2/(s_1+1)$$

$$P_{22,k}/r = s_3 - s_2/(s_1+1)$$

where, $q_{11}/r$, $q_{12}/r$, $q_{22}/r$ are the level variance, the level-trend covariance and the trend variance, each divided by the variance of the repeatability of the observations;

$P_{11}/r$, $P_{12}/r$, $P_{22}/r$ are the level estimate variance, the level-trend estimate covariance and the trend estimate variance, each divided by the repeatability of the observations;

Obs = observed value of parameter;

Delta = difference between observed value of parameter and value predicted from previous level and trend estimates;

Level = Level estimate;

Trend = Trend estimate;

$s_1, s_2, s_3$ are defined by the above equations, and used to simplify the algebra;

subscript k denotes current point in time series; and subscript k−1 denotes previous point in time series.

All the available performance measurement differences, gathered over time, can be processed, using the above algorithm (or one of the other prior art techniques) to produce sets of measurement difference level estimates, trend estimates and differences between observed and predicted values (or output appropriate to the other prior art techniques) corresponding to each observed set of performance measurement differences. The other prior art techniques can similarly be operated on time series data to produce results in accordance with their known capabilities. In the case of Bayesian Inferencing, each set of measurement difference level estimates produced can be used as input in the method according to the invention to give estimates of component changes and/or sensor biases that are unaffected, as far as possible, by spurious disturbances in the performance measurement differences. Furthermore, each set of measurement difference trend estimates can be used as input in the method according to the invention to give estimates of the rate of change of component changes and/or sensor biases, and each set of differences between observed and predicted measurement difference can be used as input in the method to detect sudden changes in the component changes and/or sensor biases from one point to the next. If other prior art algorithms are used, the sets of output produced can, in a similar manner, be input to the method according to the invention to produce corresponding component change and/or sensor bias assessments.

EXAMPLES OF THE ANALYTICAL METHODS OF THE INVENTION

Figure 2:
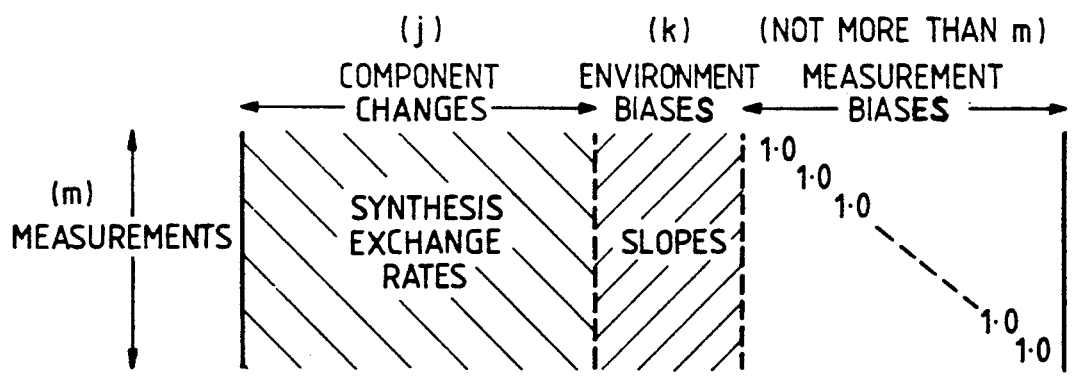
Figure 3:
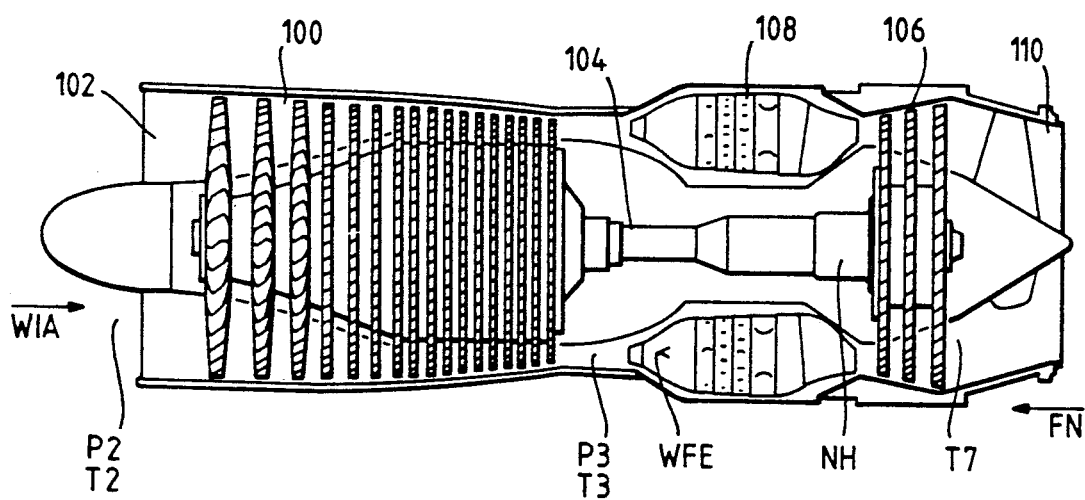
Figure 4:
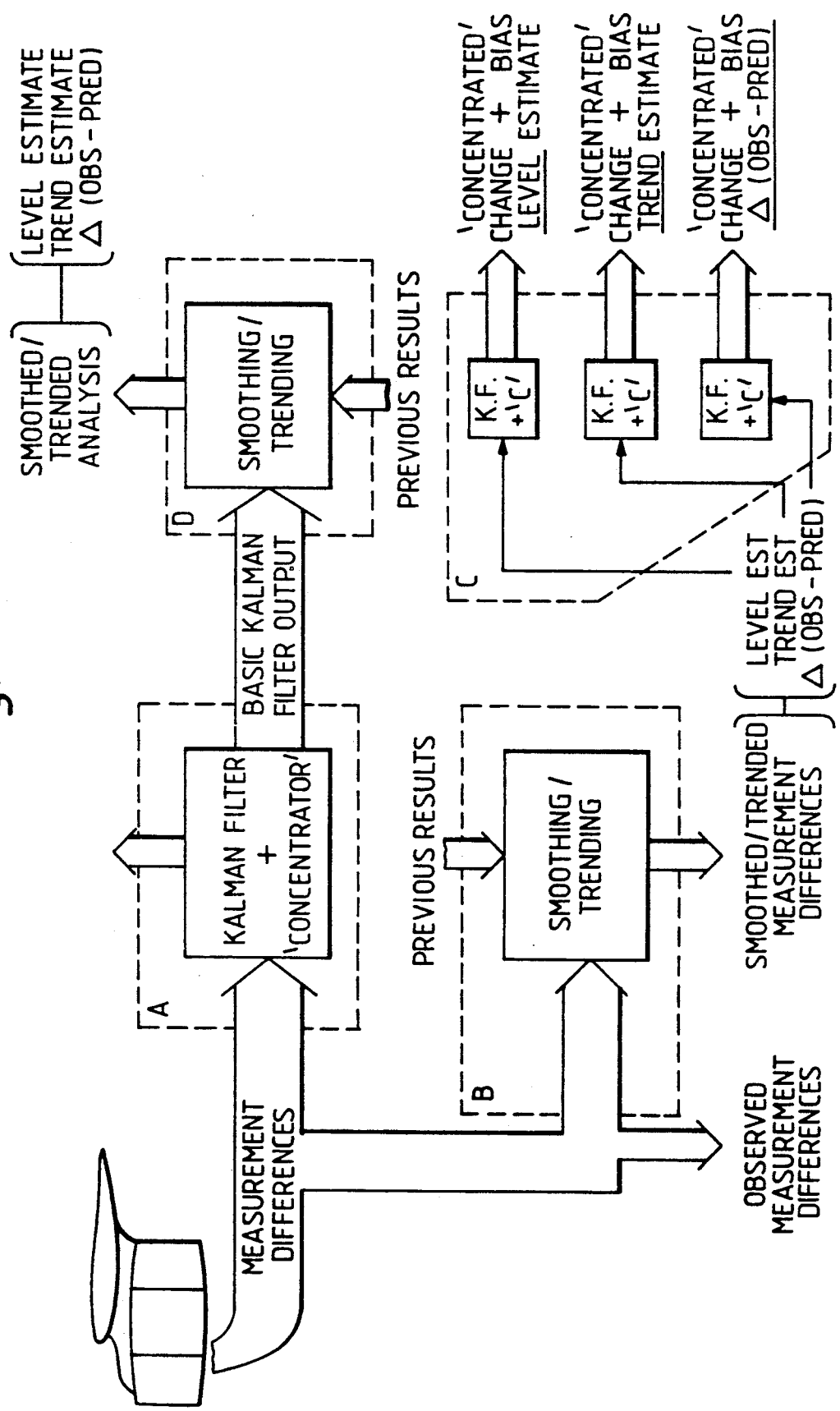

In the further description of the invention, reference will be made to the accompanying drawings, in which:

FIG. 1 is a schematic illustration of the analytical situation to which the invention is applied, FIG. 2 illustrates the System Matrix of FIG. 1, FIG. 3 is a diagrammatic sectional view of a single-spool gas turbine indicating the performance measurement sources used for an analysis of its performance by the method of the invention, and FIG. 4 is a flow diagram illustrating the application of the method of the invention to estimate levels and trends.

FIG. 1 illustrates schematically the manner in which the vector x of unknown comonent changes and unknown sensor biases produces an observed vector y of observed differences in the performance measurements. The changes are imposed on the apparatus, i.e. in the example under discussion this being the gas turbine shown in FIG. 3, and in that apparatus, the interdependence of the variables of the system give rise to performance measurement differences, the observation of which may be corrupted to some extent by noise or random variations (v). The relationships between component changes and sensor biases and observed performance measurement changes are defined by the System Matrix C shown in FIG. 2. This consists of an (m*j) component exchange rate table which sets out the effects of small changes in a series of j component performance parameters on a series of m performance measurements at specific environmental conditions and a specific power level, an environmental exchange rate table in the form of an (m*k) exchange rate table setting out the effects on the m performance measurements of small changes in the (k−1) environmental conditions and power level, and finally, a table for sensor bias, stating that a specific bias in a performance measurement produces a corresponding change in that measurement while leaving all other measurements unaffected.

FIG. 3 shows a single-shaft gas turbine jet engine with a compressor section 100 immediately downstream of an air inlet 102 and coupled by a rotary shaft 104 to a turbine section 106 that follows a combustor section 108. Air is drawn through the inlet 102 into the compressor section, the compressed air is burnt with fuel injected into the combustor section and the hot combustion gases flow through the turbine section to drive the shaft 104 before exiting as a jet through an exhaust nozzle 110. The figure indicates the measurements taken during operation, in this case being those available from normal test bed instrumentation. They consist of the inlet air flow rate (W1A), inlet total pressure (P2) and total temperature (T2), shaft speed (NH), compressor exit total pressure (P3) and total temperature (T3), fuel flow rate (WFE), turbine exit total temperature (T7) and net engine thrust (FN), this last providing a power level parameter.

The component exchange rate table, giving the percentage change in each of these measurements for a 1% change of component performance parameter is shown in Table 1. The component performance parameters here are compressor efficiency (DE25) and capacity (CW25), turbine efficiency (DE4) and capacity (CW4), and propelling nozzle area change (A8).

Table 2 gives the environmental exchange rate table showing the percentage change in each of the measurements for a 1% bias in the trust sensor measurement (FNS), the inlet pressure sensor measurement (P2S) and the inlet temperature sensor measurement (T2S).

These first two tables are concatenated with a matrix showing the effects of peformance measurement sensor bias to give the System Matrix shown in Table 3. indicates that a 1% sensor bias for any measurement produces a corresponding change in that measurement but no others. In this example, a small simplification is obtained by assuming that there can be no bias in the shaft speed measurement.

From experience and judgement of the equipment being used, standard deviations of the repeatability of the measurements from the instrumentation are produced, as shown in Table 4. From these values can be generated the a priori measurement repeatability covariance natrix R shown in JTable 5. The matrix is symmetric and is thus defined by the lower triangular elements that have been set out.

In Table 6 are listed standard deviations of the component performance parameters and sensor biases respectively which, when squared, provide a diagonal a-priori covariance matrix Q of component changes and sensor biases.

From the data of the preceding tables the Kalman Gain Matrix K can be obtained, as shown in Table 7, for use in a first pass. This data also provides an a posteriori B convariance matrix ($P_1$) of the best estimates of component changes and sensor biases in accordance with the assumptions of Tables 1 to 6. The test measurements provide a vector (y) which can then be processed with this data in accordance with the formulae given earlier for a first pass of the Kalman Filter. In subsequent passes a similar procedure is followed, using as a modified input the progressively smaller number of component changes and sensor biases remaining as one or more are discarded after each pass.

To illustrate the operation of the concentration process, a simulated example will be described based on the engine of FIG. 3 and the data of the preceding tables, in which the analysis of a specific set of component preformance parameter changes and sensor biases is considered by using, as input, the performance measurement differences generated by those changes and biases. Thus, Table 8, shows for the engine, the performance measurement difference generated by a −1% change of compressor efficency, a −0.5% bias in the engine thrust sensor (thrust being used as the power level parameter) and a +0.5% bias in the turbine exit temperature sensor. If these measurement changes are subjected to analysis by the Kalman Filter, the results obtained are as shown in Table 9.

This first analysis is then subjected to the concentration process. Tables 10 and 11 give the calculations over a total of six runs of the Kalman Filter. Column 1 of Table 10 shows the results of the first run corresponding the Table 9 and Column 1 of Table 11 shows the square roots of diagonals of the a posteriori covariance matrix $P_1$ associated with the respective component changes and sensor biases. The absolute values of normalized elements of this vecotor of component changes and sensor biases are determined and values less than the average are removed (see Table 12) and in the second column of Table 10 is shown the second run of the Kalman Filter in which these removed elements are assumed to be zero.

The elements in column 2 of Tables 10 and 11, obtained following this second run of the Kalman Filter, indicate that one element, the engine inlet airflow sensor bias, can be eliminated for a third run of the Kalman Filter (see Table 12). Similarly, as shown in Table 12, the elements in column 3 of Tables 10 and 11, obtained following this third run of the Kalman Filter, indicate that two further elements, the change of turbine efficiency and the inlet temperature sensor bias, can be eliminated for a fourth run of the Kalman Filter. Further reiteration of the process leads to a single component performance change remaining for the sixth run.

For each run an objective function is calculated, based on the six degrees of freedom of the system (the number of observed performance measurements being six). From chi-square tables with six degrees of freedom and an acceptable probability level of 95%, the maximum value of the objective function is determineed as 12.6. In simple statistical terms, passes 1 and 4 might be considered the best answers because they give the lowest values for the objective function; however, applying the further condition that the answer should explain the performance changes in terms of the minimum number of component changes and sensor biases, pass 4 of the Kalman Filter is selected as the "best answer". It will be noted that this result reproduces very closely the actual component changes and sensor biases assumed at the outset.

As discussed above, it is also possible to apply known techniques to a number of sets of performance measurement differences observed over a period of time to obtain smoothed values and estimate trends and deviations of observed values from predicted levels. The application of the Kalman Filter technique of concentrating the estimates of component performance changes and/or sensor biases into a minimum number of such parameters, as described with reference to the preceding figures and tables, to the derivation of such level and trend estimates is illustrated schematically in FIG. 4. This shows the measurement differences obtained from the ingine of FIG. 3 being employed in the one instance (block A) in the concentration process already described to give a "best answer" from an instantaneous set of data, and in the other instance (Block B) through the processing, by known techniques, of a number of such sets of data collected at intervals to derive the levels and trends contained in that data. The data from Block B itself requires further analysis to produce an estimate of the levels and trends in the component changes and/or biases that underlie the measurement diffference levels and trends produced in the process of Block B. For this purpose, the data output from Block B is input to a Kalman Filter in which a concentration process of the form already described is performed (Block C).

FIG. 4 indicates the different sets of data that may be derived in Block B, namely level estimates, trend estimates and differences ($\Delta$) between observed and predicted values. Each set is subjected to analysis separately by a Kalman Filter with which the concentration technique is applied to give a final ouptut which satisfactorily explains the data in terms of the least number of component performance changes and/or sensor biases.

Also indicated in FIG. 4 is the use of the basic (unconcentrated) output from the Kalman Filter (Block A) from a series of sets of measurement difference inputs to provide the data for the algorithms for smoothing and for deriving trends in the data (Block D), although generally processing in the manner shown in Blocks B and C will be preferred.

As an example of the manner in which the foregoing analysis of levels and trends operates, there will now be described a case in which, in a series of 20 sets of measurement readings from a gas turbine, after the 8th set the compressor efficiency (DE25) begins to fall at the rate of 0.2% in each succeeding reading. With the same sensor sources of the earlier example of tables 8-12, the measurement differences for each of the data sets 1-20 provides the matrix shown in Table 13.

By employing this matrix in the prior art, a table of level estimates for the measurement differences is produced (Table 14). When this data is processed by the Kalman Filter in the reiterative manner already described with reference to Tables 8-12, "best answers" for the smoothed values of changes in compressor efficiency appear as shown in Table 15. It will be seen that , because of smoothing, when the change of level first occurs it is not recorded beause the smoothing process indicates a change too small to be noted. When it first appears in set 11, the actual change ($-0.6$) is underestimated but the true value is soon reached (set 15 onwards).

A similar pattern emerges when the trend estimates (Table 16) are input to the Kalman Filter and by the reiterative porcess the results shown in Table 17 are produced, showing a close approach to the actual trend from measurement set 13 onwards.

From the foregoing discription, it will be clear that the methods disclosed can be applied to a wide range of apparatus and plant if required. In the gas turbine field, another application lies in test bed calibration. Thus, by running a particlular engine in different test beds in turn, the differences of sensor bias in the two test beds can be analyzed using the method of the invention.

TABLE 1

| COMPONENT EXCHANGE RATE TABLE | | | | |
| --- | --- | --- | --- | --- |
| | DE25 | CW25 | DE4 | CW4 | A8 |
| P3 | 0.0510 | 0.0240 | 0.1380 | −0.9400 | 0.4010 |
| T3 | −0.4240 | −0.1600 | 0.2970 | −0.3820 | 0.4120 |
| T7 | −0.9700 | −0.3630 | −0.8300 | 0.3550 | −0.2390 |
| WFE | −1.0190 | −0.3710 | −0.8650 | 0.3770 | 0.0870 |
| NH | 0.1010 | −0.5220 | 0.5600 | −0.3170 | 0.6470 |
| W1A | 0.5280 | 0.2060 | 0.4580 | −0.1860 | 0.4680 |

TABLE 2

| ENVIRONMENTAL EXCHANGE RATE TABLE | | |
| --- | --- | --- |
| | FNS | P2S | T2S |
| P3 | −0.6100 | −0.4140 | 0.0380 |
| T3 | −0.2920 | 0.3520 | −0.9390 |
| T7 | −0.6780 | 0.8360 | −0.9890 |
| WFE | −1.3560 | 0.5670 | −0.6460 |
| NH | −0.3240 | 0.4080 | −0.4600 |
| W1A | −0.2840 | −0.7760 | 0.5330 |

TABLE 3

| SYSTEM MATRIX | | | | | | | | | | | | |
| --- | --- | --- | --- | --- | --- | --- | --- | --- | --- | --- | --- | --- |
| | DE25 | CW25 | DE4 | CW4 | A8 | FNS | P2S | T2S | P3S | T3S | T7S | WFES | W1AS |
| P3 | 0.051 | 0.024 | 0.138 | −0.940 | 0.401 | −0.610 | −0.414 | 0.038 | 1.0 | 0 | 0 | 0 | 0 |
| T3 | 0.424 | −0.160 | 0.297 | −0.382 | 0.412 | −0.292 | 0.352 | −0.939 | 0 | 1.0 | 0 | 0 | 0 |

TABLE 3-continued

| | SYSTEM MATRIX | | | | | | | | | | | | |
|---|---|---|---|---|---|---|---|---|---|---|---|---|---|
| | DE25 | CW25 | DE4 | CW4 | A8 | FNS | P2S | T2S | P3S | T3S | T7S | WFES | W1AS |
| T7 | −0.970 | −0.363 | −0.830 | 0.355 | −0.239 | −0.678 | 0.836 | −0.989 | 0 | 0 | 1.0 | 0 | 0 |
| WFE | −1.019 | −0.371 | −0.865 | 0.377 | 0.087 | −1.356 | 0.567 | −0.646 | 0 | 0 | 0 | 1.0 | 0 |
| NH | 0.101 | −0.522 | 0.560 | −0.317 | 0.647 | −0.324 | 0.408 | −0.460 | 0 | 0 | 0 | 0 | 0 |
| W1A | 0.528 | 0.206 | 0.458 | −0.186 | 0.468 | −0.284 | −0.776 | 0.533 | 0 | 0 | 0 | 0 | 1.0 |

TABLE 4

INSTRUMENT REPEATABILITIES USED TO GENERATE R MATRIX

| P3 | 0.06300 |
|---|---|
| T3 | 0.09500 |
| T7 | 0.05100 |
| WFE | 0.04200 |
| NH | 0.01000 |
| W1A | 0.09000 |
| FN | 0.08500 |
| P2 | 0.06300 |
| T2 | 0.03100 |

TABLE 5

A PRIORI MEASUREMENT REPEATABILITY COVARIANCE MATRIX (R)

| | P3 | T3 | T7 | WFE | NH | W1A |
|---|---|---|---|---|---|---|
| P3 | 0.0073391 | | | | | |
| T3 | 0.0006742 | 0.0109801 | | | | |
| T7 | 0.0015783 | 0.0034908 | 0.0096361 | | | |
| WFE | 0.0050210 | 0.0042358 | 0.0091378 | 0.0167259 | | |
| NH | 0.0007407 | 0.0016686 | 0.0033781 | 0.0043780 | 0.0017225 | |
| W1A | 0.0025462 | −0.0009660 | −0.0016902 | 0.0007052 | −0.0008274 | 0.0113458 |

TABLE 6

STANDARD DEVIATIONS FOR THE A PRIORI COVARIANCE MATRIX OF COMPONENT CHANGES AND SENSOR BIASES

| DE25 | 0.894 |
|---|---|
| CW25 | 0.950 |
| DE4 | 0.962 |
| CW4 | 0.642 |
| A8 | 1.087 |
| FNS | 0.619 |
| P2S | 0.764 |
| T2S | 0.644 |
| P3S | 0.568 |
| T3S | 0.414 |
| T7S | 0.425 |
| WFES | 0.589 |
| W1AS | 0.426 |

Note:
The covariance matrix is a diagonal matrix made up from the squares of the above values.

TABLE 7

KALMAN GAIN MATRIX ON FIRST PASS

| | P3 | T3 | T7 | WFE | NH | W1A |
|---|---|---|---|---|---|---|
| DE25 | −0.0244 | −0.4694 | 0.0029 | −0.1541 | 0.3774 | 0.0555 |
| CW25 | 0.0020 | 0.5891 | −0.1336 | −0.0275 | −0.8070 | 0.2112 |
| DE4 | −0.1849 | 0.3103 | −0.2284 | −0.1501 | 0.2518 | 0.0027 |
| CW4 | −0.4512 | −0.1045 | 0.0297 | 0.1200 | 0.0631 | 0.2487 |
| A8 | −0.0143 | 0.1009 | −0.0861 | 0.1997 | 0.4126 | 0.3788 |
| FNS | −0.1256 | 0.1128 | −0.0884 | −0.2076 | −0.0566 | −0.2489 |
| P2S | −0.1246 | −0.1394 | 0.0329 | −0.0319 | 0.4084 | −0.3576 |
| T2S | 0.0369 | −0.3847 | −0.1740 | 0.1331 | 0.0736 | −0.0036 |
| P3S | 0.4711 | −0.1432 | 0.0617 | −0.0844 | −0.0084 | −0.2272 |
| T3S | −0.0761 | 0.4203 | −0.1019 | 0.0125 | −0.2679 | 0.0425 |
| T7S | 0.0345 | −0.1074 | 0.4657 | −0.2597 | 0.0478 | 0.2568 |
| WFES | −0.0907 | 0.0254 | −0.4989 | 0.4556 | −0.0202 | −0.1308 |
| W1AS | −0.1278 | 0.0450 | 0.2580 | −0.0684 | −0.0635 | 0.4264 |

TABLE 8

Measurement Differences (y) created by −1% compressor efficiency, −0.5% thrust (power setting) bias and +0.5% turbine exit temperature bias

| Compressor exit pressure change | (P3) | +0.254% |
|---|---|---|
| Compressor exit temperature change | (T3) | +0.570% |
| Turbine exit temperature change | (T7) | +1.809% |
| Fuel flow change | (WFE) | +1.697% |
| Shaft speed change | (NH) | +0.061% |
| Inlet airflow change | (W1A) | −0.386% |

TABLE 9

Analysis by Kalman Filter of above measurement changes

| Compressor efficiency change | (DE25) | −0.528%+ |
|---|---|---|
| Compressor flow capacity change | (CW25) | −0.083% |
| Turbine efficiency change | (DE4) | −0.524%* |
| Turbine flow capacity change | (CW4) | −0.009% |
| Propelling nozzle area change | (A8) | +0.116% |
| Thrust sensor bias | (FNS) | −0.387%+ |
| Inlet pressure sensor bias | (P2S) | +0.057% |
| Inlet temperature sensor bias | (T2S) | −0.293%* |
| Compressor exit pressure sensor bias | (P3S) | +0.094% |
| Compressor exit temperature sensor bias | (T3S) | +0.024% |
| Turbine exit temperature sensor bias | (T7S) | +0.253%+ |
| Fuel flow sensor bias | (WFES) | −0.089% |
| Inlet airflow sensor bias | (W1AS) | +0.175%* |

Notes
1. Note underestimation of changes/biases used to generate measurements (+), and estimation of spurious changes/biases (significant values marked *) caused by "smearing".
2. No shaft speed sensor bias is assumed to be present.

TABLE 10

Sequential estimates of component changes and sensor biases

| | Pass No. | | | | | |
|---|---|---|---|---|---|---|
| | 1 | 2 | 3 | 4 | 5 | 6 |
| DE25 | −0.528% | −0.530% | −0.573% | −1.004% | −1.061% | −1.227% |
| CW25 | −0.083% | — | — | — | — | — |
| DE4 | −0.524% | −0.326% | −0.288% | — | — | — |
| CW4 | −0.009% | — | — | — | — | — |
| A8 | +0.116% | — | — | — | — | — |
| FNS | −0.387% | −0.502% | −0.514% | −0.487% | — | — |
| P2S | +0.057% | — | — | — | — | — |
| T2S | −0.293% | −0.295% | −0.250% | — | — | — |
| P3S | +0.094% | — | — | — | — | — |
| T3S | +0.024% | — | — | — | — | — |
| T7S | +0.253% | +0.388% | +0.414% | +0.488% | +0.434% | — |
| WFES | −0.089% | — | — | — | — | — |
| W1AS | +0.175% | +0.046% | — | — | — | — |
| Objective Function Value | 0.021 | 0.214 | 0.244 | 0.043 | 27.932 | 69.811 |

TABLE 11

Square roots of diagonals of $P_1$ matrix

| | Pass No. | | | | | |
|---|---|---|---|---|---|---|
| | 1 | 2 | 3 | 4 | 5 | 6 |
| DE25 | 0.68121 | 0.53285 | 0.52030 | 0.04418 | 0.04282 | 0.03405 |
| CW25 | 0.71771 | — | — | — | — | — |
| DE4 | 0.66073 | 0.35918 | 0.34459 | — | — | — |
| CW4 | 0.47459 | — | — | — | — | — |
| A8 | 0.75463 | — | — | — | — | — |
| FNS | 0.44891 | 0.11166 | 0.10670 | 0.09352 | — | — |
| P2S | 0.56342 | — | — | — | — | — |
| T2S | 0.49342 | 0.32309 | 0.30037 | — | — | — |
| P3S | 0.41307 | — | — | — | — | — |
| T3S | 0.31521 | — | — | — | — | — |
| T7S | 0.31066 | 0.13278 | 0.11353 | 0.06837 | 0.06759 | — |
| WFES | 0.43457 | — | — | — | — | — |
| W1AS | 0.32263 | 0.12175 | — | — | — | — |

TABLE 12

Absolute values of normalized estimates of component changes and sensor biases, obtained by dividing the elements in Table 10 by the elements in Table 11, and removing sign.

| | Pass No. | | | | | |
|---|---|---|---|---|---|---|
| | 1 | 2 | 3 | 4 | 5 | 6 |
| DE25 | 0.775 | 0.995 | 1.101 | 22.725 | 24.778 | 36.035 |
| CW25 | 0.116* | — | — | — | — | — |
| DE4 | 0.793 | 0.908 | 0.836+ | — | — | — |
| CW4 | 0.019* | — | — | — | — | — |
| A8 | 0.154* | — | — | — | — | — |
| FNS | 0.862 | 4.496 | 4.817 | 5.207× | — | — |
| P2S | 0.101* | — | — | — | — | — |
| T2S | 0.594 | 0.913 | 0.832+ | — | — | — |
| P3S | 0.228* | — | — | — | — | — |
| T3S | 0.076* | — | — | — | — | — |
| T7S | 0.814 | 2.922 | 3.647 | 7.138 | 6.421× | — |
| WFES | 0.205* | — | — | — | — | — |
| W1AS | 0.542 | 0.378+ | — | — | — | — |
| Average | 0.406 | | | | | |

Notes
1. *denotes elements rejected because they are less than the average (pass 1 only)
2. + denotes elements rejected because they are less than the values in the previous pass
3. × denotes elements rejected because they are the lowest values in the current pass.

TABLE 13

MEASUREMENT DIFFERENCES FOR 20 SERIAL SETS OF READINGS

| SET | P3 | T3 | T7 | WFE | NH | W1A |
|---|---|---|---|---|---|---|
| 1 | 0.000 | 0.000 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | −0.010 | 0.085 | 0.194 | 0.204 | −0.020 | −0.106 |
| 10 | −0.020 | 0.170 | 0.388 | 0.408 | −0.040 | −0.211 |
| 11 | −0.031 | 0.254 | 0.582 | 0.611 | −0.061 | −0.317 |
| 12 | −0.041 | 0.339 | 0.776 | 0.815 | −0.081 | −0.422 |
| 13 | −0.051 | 0.424 | 0.970 | 1.019 | −0.101 | −0.528 |
| 14 | −0.061 | 0.509 | 1.164 | 1.223 | −0.121 | −0.634 |
| 15 | −0.071 | 0.594 | 1.358 | 1.427 | −0.141 | −0.739 |
| 16 | −0.082 | 0.678 | 1.552 | 1.630 | −0.162 | −0.845 |
| 17 | −0.029 | 0.763 | 1.746 | 1.834 | −0.182 | −0.950 |
| 18 | −0.102 | 0.848 | 1.940 | 2.038 | −0.202 | −1.056 |
| 19 | −0.112 | 0.933 | 2.134 | 2.242 | −0.222 | −1.162 |
| 20 | −0.122 | 1.018 | 2.328 | 2.446 | −0.242 | −1.267 |

TABLE 14

LEVEL ESTIMATES FOR THE MEASUREMENT DIFFERENCES

| SET | P3 | T3 | T7 | WFE | NH | W1A |
|---|---|---|---|---|---|---|
| 1 | 0.000 | 0.000 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | −0.006 | 0.047 | 0.107 | 0.113 | −0.011 | −0.058 |
| 10 | −0.015 | 0.123 | 0.281 | 0.295 | −0.029 | −0.153 |
| 11 | −0.026 | 0.213 | 0.488 | 0.513 | −0.051 | −0.266 |
| 12 | −0.037 | 0.310 | 0.708 | 0.744 | −0.074 | −0.386 |
| 13 | −0.049 | 0.406 | 0.928 | 0.975 | −0.097 | −0.505 |
| 14 | −0.060 | 0.499 | 1.143 | 1.200 | −0.119 | −0.622 |
| 15 | −0.071 | 0.590 | 1.350 | 1.418 | −0.141 | −0.735 |
| 16 | −0.082 | 0.678 | 1.552 | 1.630 | −0.162 | −0.845 |
| 17 | −0.092 | 0.765 | 1.749 | 1.838 | −0.182 | −0.952 |
| 18 | −0.102 | 0.850 | 1.944 | 2.042 | −0.202 | −1.058 |
| 19 | −0.112 | 0.934 | 2.138 | 2.246 | −0.223 | −1.164 |
| 20 | −0.123 | 1.019 | 2.331 | 2.448 | −0.243 | −1.269 |

TABLE 15

FINAL ESTIMATES OF LEVELS OF CHANGES AND/OR BIASES

| SET | DE25 | CW25 | DE4 | CW4 | A8 | FNS | P2S | T2S | P3S | T3S | T7S | WFES | W1AS |
|---|---|---|---|---|---|---|---|---|---|---|---|---|---|
| 1 | 0.000 | 0.000 | 0.000 | 0.000 | 0.000 | 0.000 | 0.000 | 0.000 | 0.000 | 0.000 | 0.000 | 0.000 | 0.000 |
| 2 | 0.000 | 0.000 | 0.000 | 0.000 | 0.000 | 0.000 | 0.000 | 0.000 | 0.000 | 0.000 | 0.000 | 0.000 | 0.000 |
| 3 | 0.000 | 0.000 | 0.000 | 0.000 | 0.000 | 0.000 | 0.000 | 0.000 | 0.000 | 0.000 | 0.000 | 0.000 | 0.000 |
| 4 | 0.000 | 0.000 | 0.000 | 0.000 | 0.000 | 0.000 | 0.000 | 0.000 | 0.000 | 0.000 | 0.000 | 0.000 | 0.000 |
| 5 | 0.000 | 0.000 | 0.000 | 0.000 | 0.000 | 0.000 | 0.000 | 0.000 | 0.000 | 0.000 | 0.000 | 0.000 | 0.000 |
| 6 | 0.000 | 0.000 | 0.000 | 0.000 | 0.000 | 0.000 | 0.000 | 0.000 | 0.000 | 0.000 | 0.000 | 0.000 | 0.000 |
| 7 | 0.000 | 0.000 | 0.000 | 0.000 | 0.000 | 0.000 | 0.000 | 0.000 | 0.000 | 0.000 | 0.000 | 0.000 | 0.000 |
| 8 | 0.000 | 0.000 | 0.000 | 0.000 | 0.000 | 0.000 | 0.000 | 0.000 | 0.000 | 0.000 | 0.000 | 0.000 | 0.000 |
| 9 | 0.000 | 0.000 | 0.000 | 0.000 | 0.000 | 0.000 | 0.000 | 0.000 | 0.000 | 0.000 | 0.000 | 0.000 | 0.000 |
| 10 | 0.000 | 0.000 | 0.000 | 0.000 | 0.000 | 0.000 | 0.000 | 0.000 | 0.000 | 0.000 | 0.000 | 0.000 | 0.000 |
| 11 | −0.503 | 0.000 | 0.000 | 0.000 | 0.000 | 0.000 | 0.000 | 0.000 | 0.000 | 0.000 | 0.000 | 0.000 | 0.000 |
| 12 | −0.729 | 0.000 | 0.000 | 0.000 | 0.000 | 0.000 | 0.000 | 0.000 | 0.000 | 0.000 | 0.000 | 0.000 | 0.000 |
| 13 | −0.955 | 0.000 | 0.000 | 0.000 | 0.000 | 0.000 | 0.000 | 0.000 | 0.000 | 0.000 | 0.000 | 0.000 | 0.000 |
| 14 | −1.176 | 0.000 | 0.000 | 0.000 | 0.000 | 0.000 | 0.000 | 0.000 | 0.000 | 0.000 | 0.000 | 0.000 | 0.000 |
| 15 | −1.390 | 0.000 | 0.000 | 0.000 | 0.000 | 0.000 | 0.000 | 0.000 | 0.000 | 0.000 | 0.000 | 0.000 | 0.000 |
| 16 | −1.598 | 0.000 | 0.000 | 0.000 | 0.000 | 0.000 | 0.000 | 0.000 | 0.000 | 0.000 | 0.000 | 0.000 | 0.000 |
| 17 | −1.801 | 0.000 | 0.000 | 0.000 | 0.000 | 0.000 | 0.000 | 0.000 | 0.000 | 0.000 | 0.000 | 0.000 | 0.000 |
| 18 | −2.001 | 0.000 | 0.000 | 0.000 | 0.000 | 0.000 | 0.000 | 0.000 | 0.000 | 0.000 | 0.000 | 0.000 | 0.000 |
| 19 | −2.001 | 0.000 | 0.000 | 0.000 | 0.000 | 0.000 | 0.000 | 0.000 | 0.000 | 0.000 | 0.000 | 0.000 | 0.000 |
| 20 | −2.399 | 0.000 | 0.000 | 0.000 | 0.000 | 0.000 | 0.000 | 0.000 | 0.000 | 0.000 | 0.000 | 0.000 | 0.000 |

TABLE 16

TREND ESTIMATES FOR THE MEASUREMENT DIFFERENCES

| SET | P3 | T3 | T7 | WFE | NH | W1A |
|---|---|---|---|---|---|---|
| 1 | 0.0000 | 0.0000 | 0.0000 | 0.0000 | 0.0000 | 0.0000 |
| 2 | 0.0000 | 0.0000 | 0.0000 | 0.0000 | 0.0000 | 0.0000 |
| 3 | 0.0000 | 0.0000 | 0.0000 | 0.0000 | 0.0000 | 0.0000 |
| 4 | 0.0000 | 0.0000 | 0.0000 | 0.0000 | 0.0000 | 0.0000 |
| 5 | 0.0000 | 0.0000 | 0.0000 | 0.0000 | 0.0000 | 0.0000 |
| 6 | 0.0000 | 0.0000 | 0.0000 | 0.0000 | 0.0000 | 0.0000 |
| 7 | 0.0000 | 0.0000 | 0.0000 | 0.0000 | 0.0000 | 0.0000 |
| 8 | 0.0000 | 0.0000 | 0.0000 | 0.0000 | 0.0000 | 0.0000 |
| 9 | −0.0022 | 0.0179 | 0.0410 | 0.0431 | −0.0043 | −0.0223 |
| 10 | −0.0048 | 0.0401 | 0.0917 | 0.0963 | −0.0095 | −0.0499 |
| 11 | −0.0071 | 0.0594 | 0.1360 | 0.1429 | −0.0142 | −0.0740 |
| 12 | −0.0088 | 0.0735 | 0.1680 | 0.1765 | −0.0175 | −0.0915 |
| 13 | −0.0099 | 0.0821 | 0.1879 | 0.1973 | −0.0196 | −0.1023 |
| 14 | −0.0104 | 0.0866 | 0.1980 | 0.0280 | −0.0206 | −0.1078 |
| 15 | −0.0106 | 0.0882 | 0.2017 | 0.2119 | −0.0210 | −0.1098 |
| 16 | −0.0106 | 0.0882 | 0.2017 | 0.2119 | −0.0210 | −0.1098 |
| 17 | −0.0105 | 0.0875 | 0.2001 | 0.2102 | −0.0208 | −0.1089 |
| 18 | −0.0104 | 0.0866 | 0.1981 | 0.2081 | −0.0206 | −0.1078 |
| 19 | −0.0103 | 0.0858 | 0.1963 | 0.2062 | −0.0204 | −0.1069 |
| 20 | −0.0103 | 0.0853 | 0.1950 | 0.2049 | −0.0203 | −0.1062 |

TABLE 17

FINAL ESTIMATES OF TRENDS OF CHANGES AND/OR BIASES

| SET | DE25 | CW25 | DE4 | CW4 | A8 | FNS | P2S | T2S | P3S | T3S | T7S | WFES | W1AS |
|---|---|---|---|---|---|---|---|---|---|---|---|---|---|
| 1 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 2 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 3 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 4 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 5 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 6 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 7 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 8 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 9 | −0.0422 | 0.0000 | 0.0000 | 0.0000 | 0.0000 | 0.0000 | 0.0000 | 0.0000 | 0.0000 | 0.0000 | 0.0000 | 0.0000 | 0.0000 |
| 10 | −0.0944 | 0.0000 | 0.0000 | 0.0000 | 0.0000 | 0.0000 | 0.0000 | 0.0000 | 0.0000 | 0.0000 | 0.0000 | 0.0000 | 0.0000 |
| 11 | −0.1400 | 0.0000 | 0.0000 | 0.0000 | 0.0000 | 0.0000 | 0.0000 | 0.0000 | 0.0000 | 0.0000 | 0.0000 | 0.0000 | 0.0000 |
| 12 | −0.1730 | 0.0000 | 0.0000 | 0.0000 | 0.0000 | 0.0000 | 0.0000 | 0.0000 | 0.0000 | 0.0000 | 0.0000 | 0.0000 | 0.0000 |
| 13 | −0.1934 | 0.0000 | 0.0000 | 0.0000 | 0.0000 | 0.0000 | 0.0000 | 0.0000 | 0.0000 | 0.0000 | 0.0000 | 0.0000 | 0.0000 |
| 14 | −0.2038 | 0.0000 | 0.0000 | 0.0000 | 0.0000 | 0.0000 | 0.0000 | 0.0000 | 0.0000 | 0.0000 | 0.0000 | 0.0000 | 0.0000 |
| 15 | −0.2076 | 0.0000 | 0.0000 | 0.0000 | 0.0000 | 0.0000 | 0.0000 | 0.0000 | 0.0000 | 0.0000 | 0.0000 | 0.0000 | 0.0000 |
| 16 | −0.2077 | 0.0000 | 0.0000 | 0.0000 | 0.0000 | 0.0000 | 0.0000 | 0.0000 | 0.0000 | 0.0000 | 0.0000 | 0.0000 | 0.0000 |
| 17 | −0.2060 | 0.0000 | 0.0000 | 0.0000 | 0.0000 | 0.0000 | 0.0000 | 0.0000 | 0.0000 | 0.0000 | 0.0000 | 0.0000 | 0.0000 |
| 18 | −0.2039 | 0.0000 | 0.0000 | 0.0000 | 0.0000 | 0.0000 | 0.0000 | 0.0000 | 0.0000 | 0.0000 | 0.0000 | 0.0000 | 0.0000 |
| 19 | −0.2021 | 0.0000 | 0.0000 | 0.0000 | 0.0000 | 0.0000 | 0.0000 | 0.0000 | 0.0000 | 0.0000 | 0.0000 | 0.0000 | 0.0000 |
| 20 | −0.2008 | 0.0000 | 0.0000 | 0.0000 | 0.0000 | 0.0000 | 0.0000 | 0.0000 | 0.0000 | 0.0000 | 0.0000 | 0.0000 | 0.0000 |

We claim:

1. A method for maintaining an apparatus of the type having a performance measurement system, the apparatus including a plurality of said sensors giving inputs thereto, said inputs being subject to bias, said sensor biases producing error in the measured performance of the apparatus, the method comprising processing performance data of the apparatus to determine changes in at least one of component performance and sensor bias from a series of performance measurements taken from the apparatus, said processing utilizing Kalman filter to analyze changes in the preformance measurements, wherein a plurality of sequential runs of the Kalman filter are performed, each succeeding run after a first run reducing the possible causes of the performance measurement changes to a smaller number of component performance changes and sensor biases than the immediately preceding run, wherein for each run except the last run the component performance changes and sensor biases to be eliminated for the succeeding run are selected by evaluating a measure of significance of the component performance changes and sensor biases indicated in the current run to discard at least one of the least significant component performance changes and sensor biases, and selecting as a best answer for the cause of the performance measurement changes a result of a run in which a minimum number of component performance changes and sensor biases are able to account for the observed performance measurement changes and subsequently altering at least one of said components and sensors which are indicated by said selecting step as having most probably contributed to the observed performance measurement changes, thereby to achieve at least one of improving the performance of the apparatus and reducing the error in the measured performance of the apparatus.

2. A method for maintaining an apparatus of the type having a performance measurement system, the apparatus including a plurality of components whose individual performances affect the performance of the apparatus and a plurality of sensors included in the performance measurement system with said sensors giving inputs thereto, said inputs being subject to bias, said sensor biases producing error in the measured performance of the apparatus, the method comprising processing performance data of the apparatus to determine changes in component performance and magnitude of sensor biases in a series of performance measurements, comprising the steps of:

a) defining a priori information required by a Kalman filter, comprising:
 i) a covariance matrix of component performance changes and sensor biases;
 ii) a measurement non-repeatability covariance matrix; and
 iii) a system matrix which provides relationships between observed performance measurement changes and component performance changes and sensor biases;

b) obtaining performance measurement from the apparatus;

c) obtaining datum levels of the performance measurement from the apparatus;

d) using data obtained in steps (b) and (c) to calculate performance measurement differences from datum levels;

e) using data obtained in steps (a) and (d) to derive a most likely set of component changes and sensor biases by employing a Kalman filter;

f) evaluating an objective function giving a measure of at least one of an amount of unexplained measurement change and, an amount of component performance change and amount of sensor bias in a solution from (e);

g) discarding at least one of the component performance changes and sensor biases to leave at least one of said component performances changes and sensor biases for evaluation;

h) repeating steps (e) to (g) until the total number of component performance changes and sensor biases remaining is one;

i) considering sets of estimated component performance changes and sensor biases produced in each pass of step (e), together with the corresponding objective function evaluated according to step (f), to identify as a best answer that pass which has produced a minimum number of component performance changes and sensor biases which satisfactorily account for the observed performance measurement differences; and j) altering at least one of the components and sensors which are indicated by the said best answer as having most probably contributed to the observed performance measurement changes, thereby to achieve at least one of improving the performance of the apparatus and reducing the error in the measured performance of the apparatus.

3. The method according to claim 2, wherein the objective function is evaluated by deriving a sum of squares of the unexplained performance measurement changes, weighted according to the measurement non-repeatability covariance matrix.

4. The method according to claim 2, wherein the component peformance changes and sensor biases are normalized by dividing individual estimated component performance changes and sensor biases by square roots of corresponding diagonal elements of an a posteriori covariance matrix produced as output from the Kalman Filter.

5. The method according to claim 2, wherein, in the best answer selected step (i), elements whose values are less than a predetermined lower level are discarded.

6. The method according to claim 2, wherein an average absolute amount of normalized change is evaluated after a first pass and provides a datum for discarding component performance changes and sensor biases prior to a second pass.

7. The method according to claim 2 or claim 6 wherein, of the second and each further pass, changes in absolute amounts of normalized change relative to the preceding pass are evaluated for each of the remaining component performance changes and sensor biases and provide a datum for discarding component performance changes and sensor biases prior to the next pass.

8. The method according to claim 2, wherein a priori values for elements of the covariance matrix of the component performance changes and sensor biases are estimated and a product is formed with (i) a Kalman gain matrix of the Kalman filter and (ii) the System matrix, to evaluate a measure of confusion of desired changes and biases with other changes and biases due to said estimates, said estimates being adjusted to reduce the confusion indicated by said evaluation.

9. The method according to claim 2, wherein a priori information supplied to the Kalman filter includes a best estimate of at least one anticipated component change and performance sensor bias.

10. The method according to claim 1 or claim 2, wherein a plurality of sets of performance measurements are obtained at intervals and employed to determine levels, trends and variations from predicted values in component performance change and sensor bias.

11. The method according to claim 10, wherein said sets of performance measurements are analyzed for said levels and trends, level and trend values and the differences between observed and predicted measurements obtained from said analysis being then subjected to Kalman Filter processing.

12. The method according to claim 10, wherein said sets of performance measurements are subjected to Kalman filter processing values obtained are then analyzed for levels, trends and variations from predicted values of component change and sensor bias.

13. The method according to claim 7, wherein component performance changes and sensor biases are discarded if their absolute amounts of normalized change are less than corresponding values in said previous pass, at least one of a component performance change and a sensor bias having the largest absolute value of normalized change being retained and at least one of a component performance change and a sensor bias having the smallest absolute value of normalized change being discarded.

14. A method for analyzing data relating to observed performance changes obtained from an apparatus, which performance changes may be caused by numerous sources internal to the apparatus, said sources being respectively performance changes of components of the apparatus and systematic errors of sensors attached to the apparatus to produce the performance data, said method comprising the steps of:

applying a Kalman filter to said data to obtain results insicating changes in said sources;

statistically evaluating said results;

evaluating a measure of significance of the indicated changes in the sources and eliminating at least one of the least significant changes in the sources;

repeating said steps of applying the Kalman filter, evaluating and eliminating until only one source remains as a possible cause for the apparatus performance changes;

choosing as a most likely cause for the apparatus performance changes the sources indicated by the repeat having the fewest changes in sources which explain the apparatus performance changes and altering at least one of said apparatus and sensors to remove said one cause.

15. The data processing system according to claim 14, wherein said apparatus being analyzed is a gas turbine.

16. A data processing system for analyzing performance data obtained from an apparatus, performance of which may be affected by numerous sources, said data processing system comprising:

sensing means for sensing said performance data from said apparatus; and processing means for applying a Kalman filter to said data to obtain results indicating changes in said sources; (b) statistically evaluating said results; (c) evaluating a measure of significance of the indicated changes in the sources and eliminating at least one of the least significant changes in the sources; and (d) choosing as a most likely cause for the apparatus performance changes the sources indicated by the repeat having the fewest changes in sources which explain the apparatus performance changes and altering at least one of said apparatus and sensors to remove said one cause.

17. The data processing system according to claim 16, further comprising:

input means for inputting to said apparatus different performance conditions; and means for measuring differences sensed by said sensing means as a result of inputting said different performance conditions.

18. The data processing system according to claim 16, wherein said aparatus being analyzed is a gas turbine.

* * * * *